(12) United States Patent
Konuru et al.

(10) Patent No.: US 12,659,580 B2

(45) Date of Patent: Jun. 16, 2026

(54) RECOMMENDER SYSTEMS AND METHODS FOR AUTONOMOUS MODE SELECTION IN INSPECTION AND OTHER TOOLS

(71) Applicant: KLA Corporation, Milpitas, CA (US)

(72) Inventors: Raghavan Konuru, Kurnool (IN); Jeetsagar Ghorai, Chennai (IN); Jacob George, Cochin (IN); Niveditha LakshmiNarasimhan, Chennai (IN); Sairam Ravu, Chennai (IN); Saravanan Paramasivam, Chennai (IN); Martin Plihal, Pleasanton, CA (US); Prasanti Uppaluri, Saratoga, CA (US)

(73) Assignee: KLA Corporation, Milpitas, CA (US)

( * ) Notice: Subject to any disclaimer, the term of this patent is extended or adjusted under 35 U.S.C. 154(b) by 25 days.

(21) Appl. No.: 18/793,931

(22) Filed: Aug. 4, 2024

(65) Prior Publication Data

US 2025/0071419 A1 Feb. 27, 2025

Related U.S. Application Data

(60) Provisional application No. 63/542,091, filed on Oct. 3, 2023.

(51) Int. Cl.
H04N 23/667 (2023.01)

(52) U.S. Cl.
CPC .................................. H04N 23/667 (2023.01)

(58) Field of Classification Search
CPC ...................................................... H04N 23/667
USPC ...................................................... 348/207.99
See application file for complete search history.

(56) References Cited

U.S. PATENT DOCUMENTS

| | | | |
|---|---|---|---|
| 8,126,255 | B2 | 2/2012 | Bhaskar et al. |
| 8,664,594 | B1 | 3/2014 | Jiang et al. |
| 8,692,204 | B2 | 4/2014 | Kojima et al. |
| 8,698,093 | B1 | 4/2014 | Gubbens et al. |

(Continued)

FOREIGN PATENT DOCUMENTS

| | | |
|---|---|---|
| CN | 116297524 | 6/2023 |

OTHER PUBLICATIONS

International Search Report for PCT/US2024/042837 mailed Nov. 27, 2024.

*Primary Examiner* — Joel W Fosselman

(74) *Attorney, Agent, or Firm* — Entropy Matters LLC

(57) ABSTRACT

Methods and systems for selecting modes for a mode selection process are provided. One system includes a computer subsystem configured for determining information for a specimen and at least one value of a characteristic of the information from images generated for the specimen with an initial subset of different modes of an imaging subsystem. The computer subsystem is also configured for predicting probabilities that better values of the characteristic are determined from the images generated with the different modes other than the initial subset based on the determined at least one value of the characteristic and a relationship between the different modes and associated values of the characteristic of the information. In addition, the computer subsystem is configured for selecting an additional subset of the different modes for which the generating and determining steps are performed next by the imaging and computer subsystems, respectively, based on the predicted probabilities.

19 Claims, 4 Drawing Sheets

(56)     References Cited

U.S. PATENT DOCUMENTS

|  |  |  |  |
|---|---|---|---|
| 8,716,662 B1 | 5/2014 | MacDonald et al. | |
| 9,222,895 B2 | 12/2015 | Duffy et al. | |
| 2019/0302031 A1* | 10/2019 | Plihal | G01N 21/8806 |
| 2020/0193588 A1 | 6/2020 | Brauer et al. | |
| 2021/0097226 A1 | 4/2021 | Chao | |
| 2021/0366103 A1 | 11/2021 | Zhang et al. | |
| 2022/0373468 A1 | 11/2022 | Hsia et al. | |

* cited by examiner

RECOMMENDER SYSTEMS AND METHODS FOR AUTONOMOUS MODE SELECTION IN INSPECTION AND OTHER TOOLS

BACKGROUND OF THE INVENTION

1. Field of the Invention

The present invention generally relates to methods and systems for selecting modes for a mode selection process. Certain embodiments relate to recommender systems and methods for autonomous mode selection in inspection and other tools.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Many different approaches for setting up the output generation (e.g., imaging) parameters of processes such as those described above have been tried and developed. The most widely used mode selection method on optical inspection tools includes manually running modes in a user interface and analyzing resulting data such as signal-to-noise ratio (SNR) data. A user physically accessing the tool is expected to run a set of starter modes (learnt by experience or best known modes (BKMs) from the unexplored 10,000 or more possible mode choices). The tool grabs images and calculates various metrics for each of the defects in each mode. The user analyzes this data and chooses the next set of potentially good modes. This iterative process goes on until the user is satisfied with the "top modes" seen so far, or all the modes are exhausted or even if the user runs out of tool time.

Another currently used mode selection approach is the brute force method. In this case, a user may queue up a massive number of optics modes on the tool that are run overnight. The user may then analyze the data later after all of the optics modes have been run. Based on the data analysis, a user might still do an iteration or two of further analysis if needed.

The currently used mode selection approaches, therefore, have a number of important disadvantages. For example, the existing methods are labor intensive, require extensive expertise, and produce inconsistent results. Becoming an expert takes qualifying training certification, gaining a few years of experience through various in house and field assignments at different sites. At any point in time, there may be only a few of such experts, which is why manual optics mode selection is prone to error and is costly and time consuming. Even without significant errors, the chance of creating sub-optimal recipes is substantially high.

Accordingly, it would be advantageous to develop systems and methods for selecting modes for a mode selection process that do not have one or more of the disadvantages described above.

SUMMARY OF THE INVENTION

The following description of various embodiments is not to be construed in any way as limiting the subject matter of the appended claims.

One embodiment relates to a system configured for selecting modes for a mode selection process. The system includes an imaging subsystem configured for generating images for a specimen with different modes of the imaging subsystem. The system also includes a computer subsystem configured for determining information for the specimen and at least one value of a characteristic of the information from the images generated with an initial subset of the different modes. The computer subsystem is also configured for predicting probabilities that better values of the characteristic are determined from the images generated with the different modes other than the initial subset based on the determined at least one value of the characteristic and a relationship between the different modes and associated values of the characteristic of the information. In addition, the computer subsystem is configured for selecting an additional subset of the different modes for which the generating and determining steps are performed next by the imaging and computer subsystems, respectively, based on the predicted probabilities. The system may be further configured as described herein.

Another embodiment relates to a computer-implemented method for selecting modes for a mode selection process. The method includes the generating, determining, predicting, and selecting steps described above. Each of the steps of the method described above may be performed as described further herein. The embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for selecting modes for a mode selection process. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
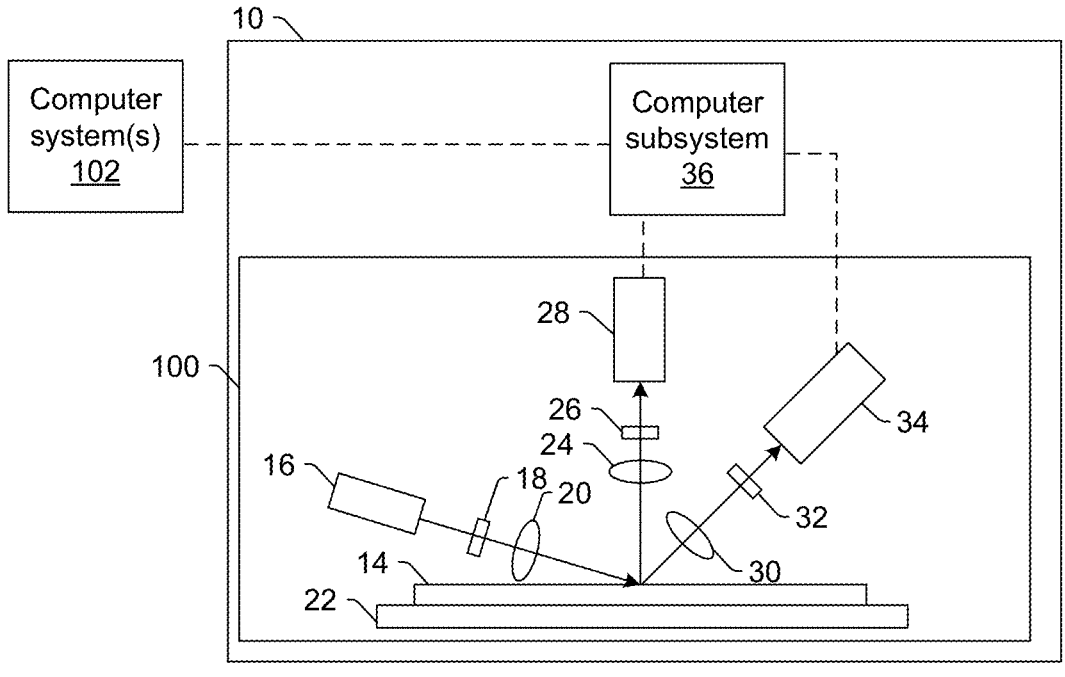
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for selecting modes for a mode selection process. Some embodiments are configured as a recommender system for autonomous mode selection for imaging tools such as inspectors and other tools described herein. Although some embodiments may be described herein with respect to inspection tools, the embodiments may be configured for any of the other imaging subsystems described herein.

"Recipe Entitlement" on an optical inspector means that the recipe is set up to give the most optimal performance on a particular specimen. Selecting the "right" optics mode is arguably the most critical piece in achieving that goal. The process of optics mode selection on optical inspector tools has traditionally been entirely manual. The user must find the "right" optics mode from many (e.g., 10,000 or more) possible choices. Therefore, the success of that process relies on the technical skill and experience of human experts working on that specimen and tool.

User based mode selection is not a desirable approach for reaching entitlement not only because it is extremely costly (in effort and labor) but also because the outcome is subjective and lacks consistency. However, despite these obvious shortcomings of current mode selection methodologies, attempts to automate this process have not been successful beyond basic brainstorming type activity. One primary barrier to mode selection automation is that algorithms are not seen as possible solutions to the problem. Instead, the focus tends to be on optical simulations that could be used to suggest the "right" optics mode.

The embodiments described herein provide a "recommender system" that provides a deterministic way of picking the "right" optics mode for a given specimen without any human intervention. The idea of using a recommender system for mode selection for inspectors (and other tools described herein) is believed to be the first of its kind.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for selecting modes for a mode selection process is shown in FIG. 1.

System 10 includes imaging subsystem 100 configured for generating images for a specimen with different modes of the imaging subsystem. The imaging subsystem may be configured as one of the types of imaging subsystems described herein such as an inspection, metrology, or defect review subsystem, which may include and/or be coupled to computer subsystem 36 and/or one or more computer systems 102.

The terms "imaging system" and "imaging subsystem" are used interchangeably herein and generally refer to the hardware configured for generating images of a specimen. In general, the imaging subsystems described herein include at least an energy source and a detector. The energy source is configured to generate energy that is directed to a specimen. The detector is configured to detect energy from the specimen and to generate output responsive to the detected energy.

In a light-based imaging subsystem, the energy directed to the specimen includes light, and the energy detected from the specimen includes light. For example, as shown in FIG. 1, the imaging subsystem includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen, the characteristics of the specimen to be measured, etc.

The illumination subsystem may be configured to direct the light to the specimen at different angles of incidence. For example, the imaging subsystem may be configured to alter one or more parameters of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence. The illumination subsystem may have any other suitable configuration known in the art for directing the light to the specimen at one or more angles of incidence sequentially or simultaneously.

The illumination subsystem may also be configured to direct light with different characteristics to the specimen. For example, optical element 18 may be configured as a spectral filter and the properties of the spectral filter can be changed in a variety of different ways (e.g., by swapping out one spectral filter with another) such that different wavelengths of light can be directed to the specimen at different times.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. The light may be scanned over the specimen in any suitable fashion such as in a serpentine-like path or in a spiral path.

The imaging subsystem includes one or more detection channels. At least one of the detection channel(s) includes a detector configured to detect light from the specimen due to illumination of the specimen by the system and to generate output responsive to the detected light. The imaging subsystem shown in FIG. 1 includes two detection channels, one formed by collector 24, element 26, and detector 28 and another formed by collector 30, element 32, and detector 34. The two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

In FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). The detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels is configured to collect light at different scattering angles than each of the other collectors.

As described further above, one or more of the detection channels may be configured to detect scattered light. Therefore, the imaging subsystem shown in FIG. 1 may be configured for dark field (DF) imaging. However, the imaging subsystem may also or alternatively include detection channel(s) that are configured for bright field (BF) imaging. Therefore, the imaging subsystems described herein may be configured for only DF, only BF, or both DF and BF imaging. Although each of the collectors are shown in FIG. 1 as single refractive optical elements, each of the collectors may include refractive optical element(s) and/or reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors in each of the detection channels may be signals or data, but not image signals or image data. In such instances, a computer system may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. Computer subsystem 36 may be further configured as described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer system, then the different computer systems may be coupled to each other such that images, data, information, instructions, etc. can be sent between the computer systems. For example, computer subsystem 36 may be coupled to computer system(s) 102 as shown by the dashed line in FIG. 1 by any suitable transmission media, which may include any suitable wired and/or wireless transmission media known in the art. Two or more of such computer systems may also be effectively coupled by a shared computer-readable storage medium (not shown).

In an electron beam imaging subsystem, the energy directed to the specimen includes electrons, and the energy detected from the specimen includes electrons. In one such embodiment shown in FIG. 2, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 2:
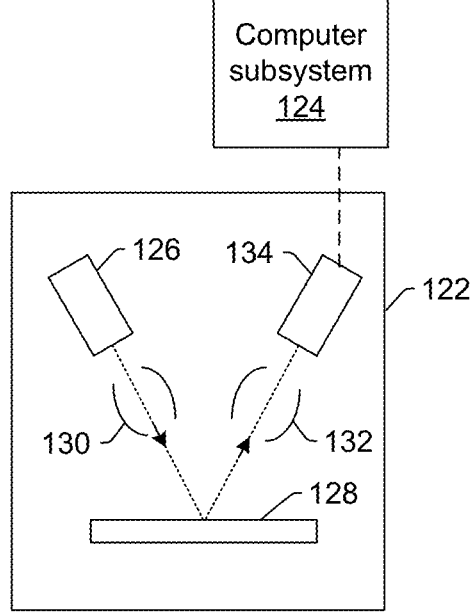

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the imaging subsystem shown in FIG. 2 may be further configured as described herein.

FIGS. 1 and 2 are provided herein to generally illustrate configurations of an imaging subsystem that may be included in the system embodiments described herein. Obviously, the imaging subsystem configurations described herein may be altered to optimize the performance of the imaging subsystem as is normally performed when designing a commercial imaging system. In addition, the systems described herein may be implemented using an existing imaging subsystem (e.g., by adding functionality described herein to an existing inspection system) such as the tools that are commercially available from KLA Corp., Milpitas, Calif. For some such systems, the methods described herein may be provided as optional functionality of the imaging subsystem (e.g., in addition to other functionality of the imaging system). Alternatively, the imaging system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 2 except that the electron beam source may be replaced with any suitable ion beam source known in the art. In addition, the imaging subsystem may include any other suitable ion beam system such as those included in commercially available focused ion beam (FIB) systems, helium ion microscopy (HIM) systems, and secondary ion mass spectroscopy (SIMS) systems.

The imaging subsystem is configured to generate output, e.g., images, of the specimen with multiple modes. In general, a "mode" is defined by the values of parameters of the imaging subsystem used for generating images of a specimen (or the output used to generate images of the specimen). Therefore, modes may be different in the values for at least one of the parameters of the imaging subsystem (other than position on the specimen at which the output is generated). For example, the modes may be different in any one or more alterable parameters (e.g., illumination polarization(s), angle(s), wavelength(s), etc., detection polarization(s), angle(s), wavelength(s), etc.) of the imaging subsystem. The imaging subsystem may be configured to scan the specimen with the different modes in the same scan or different scans, e.g., depending on the capability of using multiple modes to scan the specimen at the same time.

In a similar manner, the electron beam subsystem is configured to generate images with two or more modes, which can be defined by the values of parameters of the electron beam subsystem used for generating images for a specimen. Therefore, modes may be different in the values for at least one of the electron beam parameters of the electron beam subsystem. For example, different modes may use different angles of incidence for illumination.

The imaging subsystems described herein may be configured as an inspection system, a metrology system, and/or a defect review system. For example, the embodiments of the imaging subsystem shown in FIGS. 1 and 2 may be modified in one or more parameters to provide different imaging capability depending on the application for which it will be used. In one such example, the imaging subsystem may be configured to have a higher resolution if it is to be used for metrology rather than for inspection. In other words, the embodiments of the imaging subsystem shown in FIGS. 1 and 2 describe some general and various configurations for an imaging subsystem that can be tailored in a number of manners that will be obvious to one skilled in the art to produce systems having different imaging capabilities that are more or less suitable for different applications.

In this manner, the imaging subsystem may be configured for generating output that is suitable for detecting or re-detecting defects on the specimen in the case of an inspection system or a defect review system, respectively, and for measuring one or more characteristics of the specimen in the case of a metrology system. In an inspection system, computer subsystem 36 shown in FIG. 1 may be configured for detecting defects on specimen 14 by applying a defect detection method or algorithm to output generated by one or more of the detectors. In a defect review system, computer subsystem 124 shown in FIG. 2 may be configured for re-detecting defects on specimen 128 by applying a defect re-detection method to the output generated by detector 134 and possibly determining additional information for the re-detected defects using the output generated by the detector. In a metrology system, computer subsystem 36 shown in FIG. 1 may be configured for determining one or more characteristics of specimen 14 using the output generated by detectors 28 and/or 34. The system may be further configured for detecting or re-detecting defects on the specimen, determining characteristics of the specimen, determining other information for the specimen, etc. as described further herein.

As noted above, the imaging subsystem is configured for scanning energy (e.g., light, electrons, etc.) over a physical version of the specimen thereby generating output for the physical version of the specimen. In this manner, the imaging subsystem may be configured as an "actual" subsystem, rather than a "virtual" subsystem. However, a storage medium (not shown) and computer system(s) 102 shown in FIG. 1 may be configured as a "virtual" system. In particular, the storage medium and the computer system(s) may be configured as a "virtual" imaging system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., which are incorporated by reference as if fully set forth herein. The embodiments described herein may be further configured as described in these patents.

The system includes a computer subsystem, which may include any configuration of any of the computer subsystem(s) or system(s) described above. The computer subsystem is configured for determining information for the specimen and at least one value of a characteristic of the information from the images generated with an initial subset of the different modes. In one embodiment configured for inspection, the computer subsystem may be configured for determining information for the specimen by detecting defects on the specimen using the images generated by the imaging subsystem, the characteristic of the information may be the signal-to-noise ratio (SNR) of the detected defects, and the value of the characteristic may be the determined SNR values. Although some embodiments may be described herein with respect to SNR values, the embodiments described herein may be configured to use any other values that can be determined from images generated by any of the imaging subsystems described herein for any of the processes described herein.

In such an embodiment, the computer subsystem may be configured for separately performing defect detection for the specimen with the images generated by each of the different modes in the initial subset, respectively. In other words, the computer subsystem may be configured for performing a first defect detection with images generated with a first mode in the initial subset, a second defect detection with images generated with a second mode in the initial subset, and so on. The number of defect detections performed may therefore be equal to the number of the different modes in the initial subset, and the input to each of the defect detections may include only the images generated with the mode for which defect detection is being performed.

In one such example, the computer subsystem may separately input the images generated with each of the modes in the initial subset to a defect detection method or algorithm, which may be performed in any suitable manner. The defect detection method or algorithm used for each of the different modes may be the same. In addition, the defect detection method or algorithm may include any of the defect detection methods or algorithms known in the art. For example, the defect detection algorithm may be the MDAT algorithm that is available on some inspection tools commercially available from KLA. The defect detection algorithm may also include a deep learning (DL) type defect detection algorithm.

The images that are input to the determining step may include any of the imaging subsystem output described further herein such as images, image data, signals, image signals, etc. The images that are input to the determining step may include the raw detector output, meaning that the detector output is not processed in any manner prior to being used for defect detection. However, the images that are input to the determining step may include mode output that has been processed in some manner as it might be in a normal inspection (or other) process. Such processing may include, for example, high pass filtering, image alignment, and the like. In this manner, the images input to the determining step may be the same as if an inspection (or other) process was being performed with the mode images.

Regardless of the mode, the input to the determining step may include not just images, processed or not, generated for the specimen by that mode. For example, the input to the determining step for any of the modes may include additional information such as one or more reference images corresponding to one or more specimen images, one or more difference images generated by subtracting a reference specimen image from a test specimen image, design information for the specimen, and the like. In this manner, for any one determining step performed by the computer subsystem for any one mode, there may be multiple channels of input into the determining step for that mode.

The inputs to the determining step may vary depending on the type of process that will be performed with the modes that are ultimately selected. For example, the input to the determining step may only include the mode output for a die-to-die type inspection, but the input to the determining step may include the mode output and a reference for a die-to-database type inspection. Obviously, these are just two examples of types of defect detections that the determining step may be configured for, and which inputs are used for the determining step will ultimately depend on the specimen process being setup.

The area of the specimen for which images are generated and input to the determining step may be the same for each mode, but that is not necessarily the case, such as when one mode fails to generate any output for some of the specimen. In addition, the mode images that are used for any of the steps described herein may or may not include all of the images generated by any one mode for the specimen. In some cases, it may be advantageous to generate images for as much of the specimen as possible with any one mode, which may be determined by the known or anticipated area that will be inspected during specimen inspection. However, in the interest of saving time and resources, for any one mode, less than all of these images may be used in any of the steps performed herein. For example, instead of generating and using mode images for an entire specimen in the embodiments described herein, the mode images generated and used may be mode images generated for only half of the specimen, mode images generated for a number of limited areas on the specimen such as one center area and one edge area or a limited number of die areas on the specimen, etc. In other words, the amount of mode images used for any one step described herein may be judiciously selected to reduce the amount of time and resources used without compromising the accuracy of the results.

In one embodiment, the initial subset of the different modes includes one or more best known modes (BKMs) for a process performed on the specimen with the images generated by the imaging subsystem. For example, the optics selection process may be initialized with diversified modes. In addition, as shown in step 400 of FIG. 4, the computer subsystem may select an initial subset of the different modes. In this manner, the computer subsystem may select one or more BKMs for a process as the initial subset of the modes. The computer subsystem may identify or determine the BKMs in any suitable manner. For example, the BKM(s) may be identified by searching a storage medium (e.g., a fab database or storage medium accessible to the computer subsystem) for a process recipe for the same type of process and a similar type of specimen and identifying the mode(s) in the process recipe as the initial subset. In this manner, the initial subset of modes may vary depending on the process (e.g., array inspection vs. logic inspection, inspection vs. metrology, etc.) and the specimen type (a post-etch wafer vs. a post-lithography wafer, a wafer vs. a reticle, a wafer with front end layers formed thereon vs. a wafer having back end layers formed thereon, etc.).

The BKMs may be setup as described herein or may have been setup using a different system or method. For example, the BKMs may be manually setup recipes. However, the initial subset of modes may be arbitrarily selected or the same for each mode selection process. For example, when BKMs or other already setup recipes are not available to the computer subsystem, the computer subsystem may arbitrarily select one or more modes for the initial subset and/or may resort to a default subset of modes as the initial subset.

Various "subsets" of modes are described herein, e.g., an initial subset, an additional subset, a top subset, etc. Any of the "subsets" described herein may include one or more modes. In addition, all of the "subsets" described herein will include fewer than all of the modes available on the tool. In this manner, a "subset" of modes as that term is used herein is defined as one or more modes unless otherwise noted herein.

Figure 4:
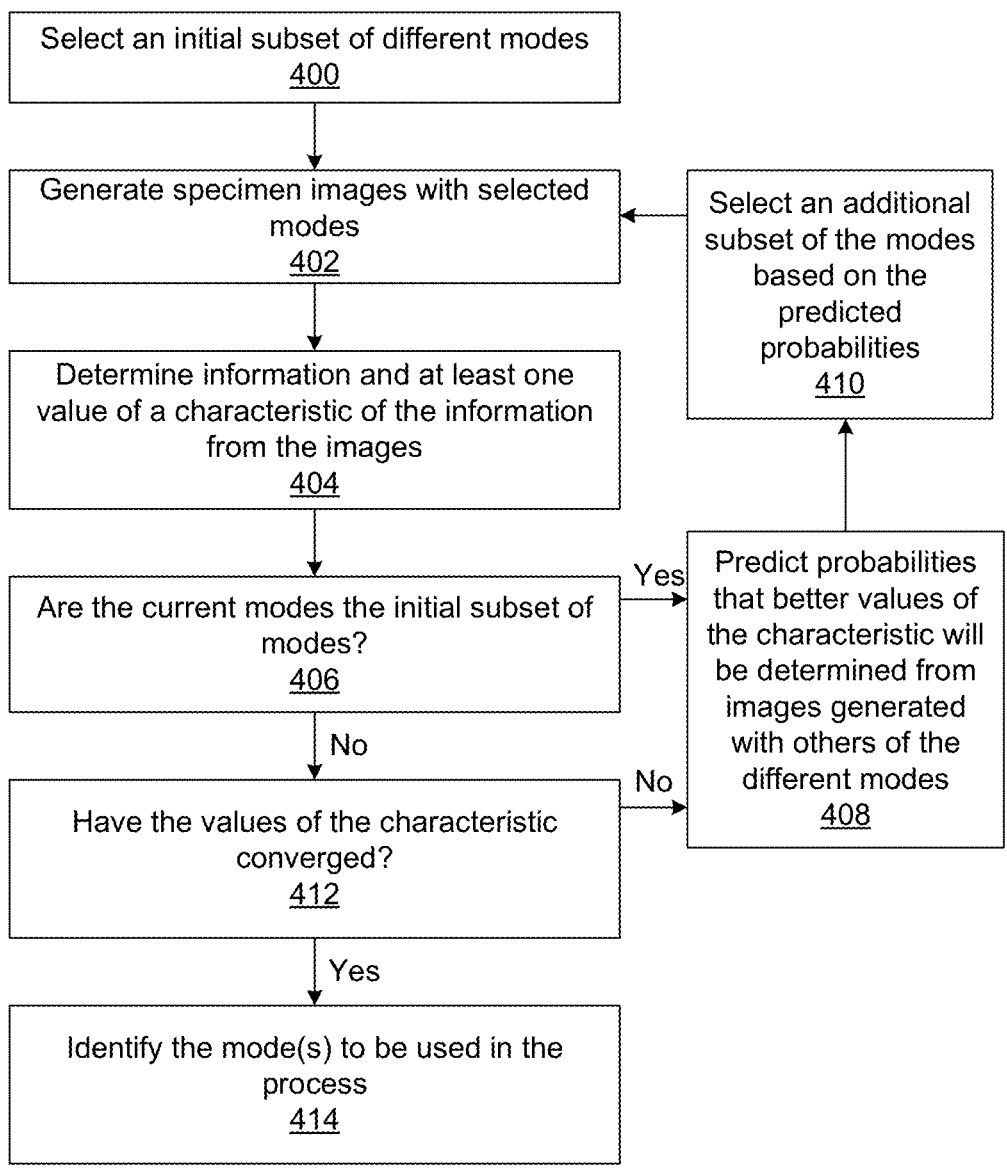
FIG. 4 is a flow chart illustrating embodiments of steps that may be performed for selecting modes for a mode selection process.

Once the initial subset of modes are selected or identified, the imaging subsystem generates specimen images with the selected mode(s), as shown in step 402 of FIG. 4. The imaging subsystem may generate the images in any instance of step 402 as described further herein. The computer subsystem may then determine information and at least one value of a characteristic of the information from the images, as shown in step 404, which may be performed as described further herein. As shown in step 406, the computer subsystem may then determine if the current modes being considered are the initial subset of the modes. If the current modes are the initial subset, then the computer subsystem may proceed to search and evaluate the unexplored mode space, as shown in steps 408 and 410 described further herein. If the current modes are not the initial subset, then the computer subsystem may compare the results generated with different mode subsets to thereby determine in step 412 if the process has converged, which may be performed as described further herein.

The computer subsystem is also configured for predicting probabilities that better values of the characteristic are (will be) determined from the images generated with the different modes other than the initial subset based on the determined at least one value of the characteristic and a relationship between the different modes and associated values of the characteristic of the information, as shown in step 408 of FIG. 4. For example, the embodiments described herein use the fundamental principle that most of the optics modes are not entirely independent. In other words, different modes may be defined by at least some of the same hardware parameters. In this manner, modes that are not entirely independent means modes that are not be entirely separate in parameter space. In particular, some optics modes may be thought of as combinations of smaller sets of unique optics modes available on the tool.

In one such example, one mode may use a broad wavelength band, which may include smaller wavelength bands used by other modes on the tool, that can be thought of unique narrow bands. In this manner, one mode may use the same wavelength band as a combination of two or more other modes. Other mode parameters such as aperture configuration may have similar relationships to each other. In addition, some mode parameters such as focus offsets can be considered a function of the different values of those parameters available on the tool. In this case, if the initial subset of the different modes includes a few values of focus offsets, the values of the characteristic of the information determined from the images generated with those modes can be used to interpolate and predict the response of the characteristic values to a broad range of the focus offsets.

The embodiments described herein use this information to build a relationship that can be used to predict the response of optics modes given the response of some starter optics modes. In addition, the embodiments described herein can build a relationship that can predict the response of the entire optics mode space given the response of some unique optics modes. The relationship may be embodied in an algorithm that can be used to predict the probabilities. In this manner, the input to the algorithm may be the starter optics modes (or the current modes) and the values of the characteristic of the information determined from the images generated with the starter (or current modes). The output of the algorithm is probabilities that other modes will produce images from which better values of the characteristic can be determined. In this manner, the computer subsystem can use the relationship to analyze unexplored mode space (i.e., modes of the imaging subsystem other than the initial subset of the modes).

The "better" values may vary depending on the types of values that are determined for the characteristic of the information. For example, if the information is detected defects on the specimen and the values of the characteristic are SNR values of the defects detected in the specimen images, then better values would be higher SNR values of the detected defects. In another example, if the information is detected defects on the specimen and the values of the characteristic are the numbers of nuisances also detected in the images generated for the specimen, then the better values would be lower numbers of nuisances in the defect detection results. The values may be quantitative, but they may also be qualitative. For example, if the information is detected defects on the specimen, a qualitative value of the information may be an indication of whether or not the defects could be detected across the entire inspected area of the specimen (e.g., if the amount of nuisance is so large the inspection may quit prematurely or if an optics mode is not able to generate useful images for a portion of the specimen). In this manner, better qualitative values would be an indication that an optics mode could be used to inspect an entire inspected area of the specimen.

In one embodiment, the relationship is determined by reinforcement learning. Therefore, one important new feature of the embodiments described herein is the use of a machine learning (ML) approach for solving the problem of selecting optics modes for defects. Reinforcement learning is a type of ML that can be used to make decisions to achieve the best results. Reinforcement learning is different from supervised and unsupervised learning and is generally based on a Markov decision process. The reinforcement learning used to determine the relationship may use any suitable algorithm known in the art. The reinforcement learning may also be performed in a deep learning (DL) configuration using deep neural networks. In any of these implementations, the reinforcement learning may be model-based or model-free.

In model-based reinforcement learning, the physics of the imaging subsystem may be used to build a representation or model of the environment, i.e., the relationship described herein. Model-based reinforcement learning may be useful in the embodiments described herein because the physics of the imaging subsystem may be relatively well-defined and unchanging. The relationship may be built by taking actions from state-to-state within the environment, identifying the new state and its associated value, and then associating the action-state transition with the value. Once the relationship is built, the computer subsystem or another component may simulate sequences through the relationship based on the probability of optimal cumulative values. In this manner, values may be assigned to the action sequences as well. In addition, different strategies within the environment may be learned to achieve the desired goal.

In some embodiments, the relationship is determined by reinforcement learning in which the different modes are states and the associated values are values of the states. For example, in the case of SNR values, the embodiments may use a reinforcement learning approach where the optics modes are thought of as states and the associated SNR as the value of those states. This relationship configuration may be suitable for situations in which the imaging subsystem is an inspection subsystem and when the information determined from the specimen images includes defects detected in the specimen images. Such a relationship may however also be useful in other processes such as metrology processes, in which high signal, low noise images are preferable for determining metrology information for a specimen. However, the states and the values of the states may vary based on the imaging subsystem and the specimen. In other words, the relationship may be defined based on the modes of the imaging subsystem as well as any values of any characteristics of information for a specimen that will be determined from images generated with the modes.

In another embodiment, predicting the probabilities is not trained with pre-existing data. For example, one of the important new features of the embodiments described herein is the idea of using physics coupled with predicting algorithms instead of training on pre-existing data. More specifically, if the embodiments described herein were config-ured to recommend modes using a learning algorithm that is set up by supervised or unsupervised training, the embodi-ments would have to be trained with a massive amount of pre-collected optics and SNR data from different wafers, wafer layers, and tools and use that trained algorithm to predict modes for a new wafer. In contrast, the embodiments described herein do not use any pre-collected data. On every new wafer, the embodiments use results, e.g., SNR values, from initial modes and modes predicted by the computer subsystem to run in each iteration. The relationship (e.g., nodes and connections in the graph) is constructed using the knowledge of how the components of the optics modes are connected in parameter space. In this manner, the embodi-ments use physics coupled with predicting algorithms because the relationship (e.g., graph structure) is static and is fixed for a given tool model.

In a further embodiment, the at least one value of the characteristic and the associated values of the characteristic are SNR values of defects detected in the images. For example, in a reinforcement learning approach in which the optics modes are thought of as states and the associated SNR as the values of those states, the computer subsystem can build transitions connecting various modes based on phys-ics. In this manner, the predicting probabilities step may include predicting the probability of a transition in any axis to improve the SNR further. As described further above, the associated values of the states in the relationship may vary depending on the imaging subsystem and the specimen. In addition, the values of the characteristic of the information determined by the embodiments described herein should be the same as the associated values of the characteristic in the relationship. For example, if the embodiments described herein are intended to find the modes with the highest SNR values of defects detected in images, then the at least one value of a characteristic of information determined from images generated with a subset of the different modes and the associated values of the characteristic in the relationship should both be SNR values of defects detected in images.

In an additional embodiment, the relationship is based on physics of the imaging subsystem, and the system is con-figured for selecting modes for a mode selection process performed for a different specimen for which the imaging subsystem generates images in a process performed on the different specimen. In particular, since the relationship described herein is generated (by the computer subsystem or another system or method) based on the physics of the imaging subsystem, i.e., the modes that are available on the imaging subsystem and the transitions or connections between them, the same relationship can be used for differ-ent specimens and different recipes. For example, a graph such as that described herein can be the same for different stages of a fabrication process or a wafer. In other words, as long as the imaging subsystem and its mode space does not change, the same relationship can be used for selecting modes in a mode selection process for dramatically different recipes (e.g., array mode inspection vs. logic inspection) and for dramatically different specimens (e.g., different types of wafers). The same relationship may also be reused for different instances of the same tool configuration, e.g., multiple inspection tools having the same make and model. In this manner, the relationship described herein may change with tool type. In addition, if the optical parameter space of the tool changes, then the relationship may be modified and/or updated. The reusability of the relationship (and any graphs generated for the relationship) provides significant advantages for generating different recipes for different specimens performed with the same tool.

In another embodiment, the computer subsystem is con-figured for determining the relationship by reinforcement learning. For example, the computer subsystem (and there-fore the systems described herein) may be configured for generating the relationship and then using the relationship as described herein. However, another system or method may be configured for determining the relationship, and then the embodiments described herein may access or acquire the relationship (e.g., in a computer-readable storage medium in which it has been stored by the other system or method) and use the relationship as described herein. In this manner, one system or method may generate the relationship, and another system or method may use the relationship.

In another embodiment, the computer subsystem is con-figured for generating a graph that visualizes the relation-ship. The relationship and the graph visualizing the rela-tionship may be generated using the reinforcement learning described further herein. In a further embodiment, the dif-ferent modes include an entire optics mode space for the imaging subsystem. For example, when the optics modes are thought of as states, the associated SNR values as the values of those states, and the computer subsystem builds transi-tions connecting various modes based on the physics of the imaging subsystem, the entire optics mode space can be visualized as a giant graph. The computer subsystem may be configured to build the graph by generating the states based on the physics and modes of the imaging subsystem. The values of the states may be determined by the computer subsystem, for example, from images grabbed using the tool. The associated values of the states may therefore not be static or precomputed values. For example, for each run that is performed, the computer subsystem may collect the values, e.g., SNR values, and populate the values in the graph.

Figure 3:
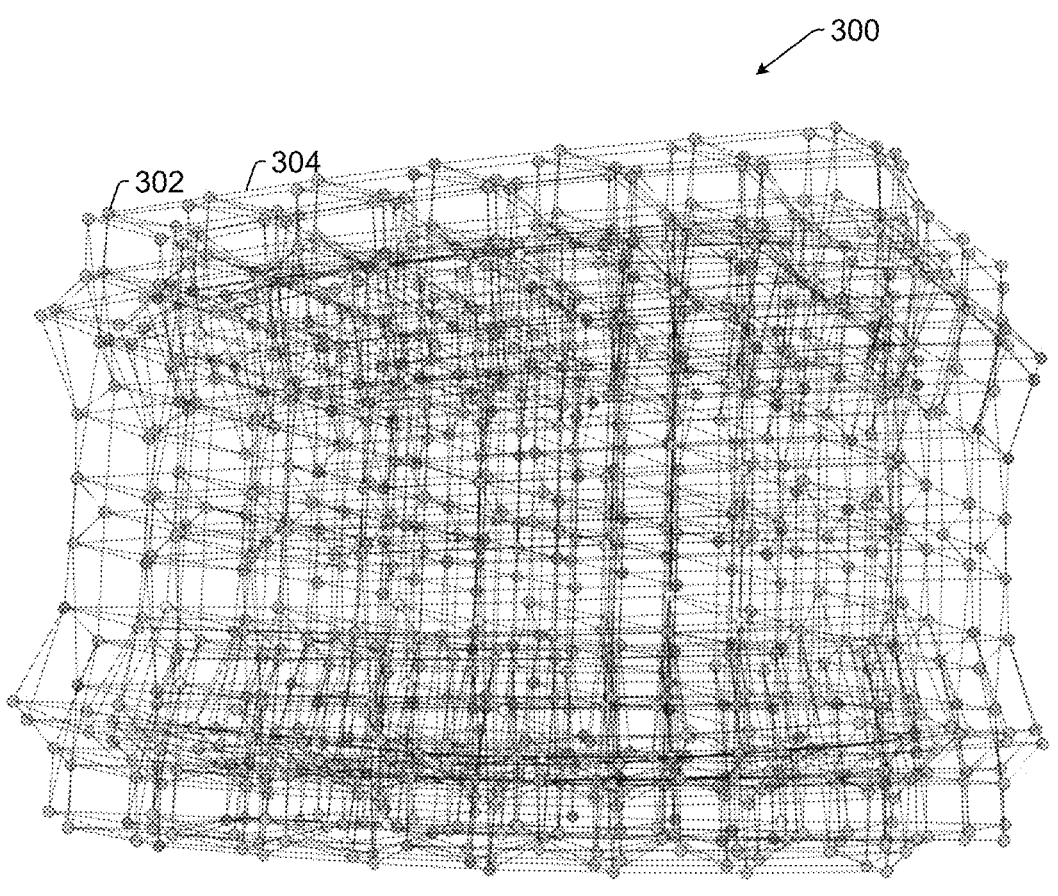
FIG. 3 is a schematic diagram illustrating an embodiment of a graph that may be generated by the embodiments described herein to visualize a relationship between different modes of an imaging subsystem and associated values of a characteristic of information determined for a specimen from images generated with the different modes.

FIG. 3 shows one embodiment of such a graph. In graph 300, each of states 302 corresponds to a mode or a value of a parameter of the imaging subsystem that may define a mode, and transitions 304 connect various modes. The graph shown in FIG. 3 may be generated to show the fully connected optics mode space. As can be seen from FIG. 3, a graph for an entire optics mode space may be substantially complex, particularly when there are many variable imaging subsystem parameters like wavelength, aperture, polariza-tion, focus offset, etc.

The computer subsystem may be configured to display the graph to a user (e.g., using a display device (not shown)) to promote user understanding of the relationship between the modes and their associated values. The computer subsystem may be configured to further promote user understanding of the graph in a variety of ways (not shown). For example, the states of the subset of modes that are currently being evaluated in the mode space may be indicated in the graph, e.g., via highlighting, a particular color, etc. Previously explored and unexplored modes in the mode space may also be differentiated from each other via highlighting, different colors, etc. Transitions between the modes may also be similarly indicated in the graph for modes previously explored, currently explored, and unexplored.

In a similar manner, the computer subsystem may be configured to extract certain portions of the graph shown in FIG. 3 corresponding to, for example, a smaller portion of the entire mode space and separately display the extracted portions of the graph to the user. For example, the portion of the entire mode space showing just transitions between the wavelength parameters of different modes may be extracted by the computer subsystem and displayed to a user. In addition, rather than a single graph such as that shown in FIG. 3 for the entire mode space of an imaging subsystem, the computer subsystem may be configured for generating a number of smaller graphs, e.g., each of which may be generated for one mode parameter such as illumination wavelength, in which the different values of the one mode parameter are the states with transitions between them. In combination, multiple, such single mode parameter graphs may cover the entire mode space of the imaging subsystem.

The computer subsystem may also configure the graph and a UI that displays the graph to a user, so that, for instance, by clicking on any state or transition, the information for the mode or transition is displayed to the user. The UI that is included in the system for such purposes may have any suitable configuration known in the art.

In one embodiment, the computer subsystem is configured for predicting additional probabilities that additional better values of the characteristic are determined from the images generated with additional different modes of the imaging subsystem other than the initial subset based on the determined at least one value of the characteristic and an additional relationship between the additional different modes and additional associated values of the characteristic of the information. In this manner, for any one imaging subsystem, there may be more than one relationship (each of which may be separately generated as described further herein), and the computer subsystem may perform the predicting probabilities step separately and independently with each different relationship. The determined at least one value of the characteristic that is used with each different relationship may be the same. For example, the SNR values of defects detected in images generated with an initial subset of the different modes may be used with each of the different relationships to predict different probabilities. The probabilities predicted with each of the relationships may be used in selecting other subsets of the different modes as described herein. In other words, probabilities predicted with different relationships may be input together into the selecting step described herein so that the next modes may be selected based on all of the predicted probabilities.

In one such embodiment, the different modes and the additional different modes are defined by at least one mutually exclusive parameter of the imaging subsystem. Modes that are defined by at least one "mutually exclusive parameter" of the imaging subsystem may be any modes that have one or more parameters that are different in such a way that the information determined with one of the modes cannot be used to predict probabilities as described herein for another of the modes. Such modes can be identified based on the physics of the imaging subsystem, and then different relationships can be generated and used as described herein for such modes.

In another such embodiment, the different modes and the additional different modes are defined by at least one orthogonal and non-overlapping parameter of the imaging subsystem. For example, the computer subsystem may be configured to generate a graph described above for mode components that are expected to yield orthogonal information. In one such example, different illumination polarizations that are mutually exclusive from each other may yield orthogonal information. Therefore, different relationships may be generated for such modes and may be used to separately evaluate their corresponding modes.

The idea of interdependency of modes is fundamental to how the embodiments evaluate optics modes. Using reinforcement learning is only one of the ways to effectively exploit this concept. For example, another approach that can be used by the embodiments described herein to predict the probabilities is to predict images that would be generated by unexplored optics modes given images of a few modes (e.g., the initial subset of modes or a few unique modes). The computer subsystem can use such predicted images to calculate predicted SNR, for example, which can advantageously take away the need to run optics modes to get SNR. Prediction of the images can be performed by physics-based addition of images from independent mode components or by using deep generative algorithms that can use preexisting data or SEM/design images to generate images of unexplored modes.

The computer subsystem is further configured for selecting an additional subset of the different modes for which the generating and determining steps are performed next by the imaging and computer subsystems, respectively, based on the predicted probabilities, as shown in step 410 of FIG. 4. The computer subsystem therefore picks potential good modes or a potential good mode set based on the predicted probabilities. In this manner, the recommender system embodiments described herein can find the minimal set of optics modes to be run on the tool to get to the top mode. In one embodiment, selecting the additional subset of the different modes includes selecting one or more of the different modes other than the initial subset for which highest values of the probabilities are predicted. For example, modes with the highest probability may be selected and run (i.e., the specimen may be scanned with the selected modes to thereby generate images with the selected modes), and new SNR scores may be determined for the new modes. In this manner, the embodiments described herein provide a deterministic way to select modes for evaluation during the recipe setup phase. In addition, as described further herein, the embodiments provide a deterministic way to identify when the mode selection process has converged, meaning that the mode evaluation results have stopped changing.

Performing these deterministic steps in an automated way enables the embodiments described herein to converge after evaluation of a substantially small number of the total modes available. For example, experiments performed by the inventors with the embodiments described herein for two different types of wafers were able to predict the top mode for an inspection process for each of the wafer types within 40 examined modes and without any user intervention. Since the top modes can be identified by examination of only 40 modes (instead of the thousands of modes that are available on the inspection tool) and without any user intervention, the embodiments described herein can identify the top modes substantially faster than currently used methods or systems in which modes are not selected in a deterministic way for evaluation and/or in which every mode on the tool must be run to generate images and determine information from the images.

In some embodiments, the imaging and computer subsystems are configured for performing the generating and determining steps, respectively, for the additional subset of the different modes. For example, the imaging subsystem may be configured to generate the images for the specimen with the additional subset of the modes, and the computer subsystem may then determine the information and the at least one value of a characteristic of the information from the images generated with the additional subset of the different modes. These steps may be performed as described further herein. For example, the imaging subsystem may repeat step 402 shown in FIG. 4 for the additional subset of the different modes, and the computer subsystem may repeat step 404 for the images generated with the additional subset of the modes. When steps 402 and 404 are being repeated for the additional subset of the modes, in step 406, the computer subsystem will determine that the current modes are not the initial subset of the modes and move on to step 412 described further herein.

In one such embodiment, the computer subsystem is configured for updating the predicted probabilities based on the at least one value of the characteristic determined with the additional subset of the different modes. For example, using the new SNR scores, the computer subsystem may update the probabilities of all possible transitions to further improve the SNR. In other words, the new selected subset of the different modes may be run on the imaging subsystem, the values of the characteristic of the information determined with the new modes may be used to update the predicted probabilities, and then new modes may be selected again based on the updated probabilities. In this manner, different subsets of the modes may be selected and analyzed iteratively based on previously selected mode results. This iterative process may be performed, for example, when the values of the characteristic are determined to not be converged in step 412. In addition, the predicted probabilities may be updated by inputting the newest mode results into the relationship and generating new values of the predicted probabilities. The updated predicted probabilities may then be input to step 410 in which the next subset of modes may be selected.

In another such embodiment, the computer subsystem is configured for comparing the information for the specimen determined from the images generated with the additional and initial subsets of the different modes and, based on results of the comparing step, determining if selecting the additional subset of the different modes is converging to a top subset of the different modes for a process performed on the specimen. For example, any time that the computer subsystem determines in step 406 that the modes currently being considered are not the initial subset of the modes, the computer subsystem may determine in step 412 if the values of the characteristic determined with the modes currently being considered have converged. One of the important new features of the embodiments described herein is the reliance on a convergence criterion to stop exploring new modes. For example, one of the major challenges users face in mode selection is not knowing when to stop. The embodiments described herein can advantageously address this challenge using the convergence criterion and step described herein.

In one such embodiment, the computer subsystem is configured for determining that the selecting step has converged to the top subset of the different modes when the results of the comparing indicate no improvement in the information for the specimen determined from the images generated with the additional and initial subsets of the different modes. For example, the next or additional subset of the different modes with the highest probability may be run, and the search may go on until the computer subsystem does not see any further improvement (e.g., increase in SNR, decrease in the number of nuisance detected, etc.). That is when the search can be called converged.

As shown in step 414, when the computer subsystem determines in step 412 that the values of the characteristic determined from images generated with the modes being considered have converged, the computer subsystem identifies the mode(s) to be used in the process. This step may be performed as described further herein. Alternatively, the process may be stopped when convergence has been detected, and any or all of the results generated up to that point may be output by the computer subsystem as described further herein so that another method or system can select the final mode(s) to be used in the process performed on the specimen. In other words, one system or method may be configured for mode recommendation and mode analysis, and another system or method may be configured for final mode selection.

If the computer subsystem determines in step 412 that the values of the characteristic determined from the images generated with the current modes have not converged, then the computer subsystem may repeat step 408 to predict the probabilities that better values of the characteristic will be determined from images of other modes that are in the yet to be explored mode space. Another subset of the modes may be selected in step 410 based on the new predicted probabilities, and steps 402, 404, 406, and 412 may be repeated for this new subset of the modes. In this manner, the imaging and computer subsystems may repeat the mode examination and mode space exploration steps until convergence of the mode results is detected.

Before or after the computer subsystem determines that the steps have converged (the values of the characteristic determined for the modes have stopped changing or are not improving further), the computer subsystem may perform additional analysis of all of the modes that have been examined thus far. This analysis may be performed, for example, to eliminate some modes from further consideration, which may include modes that have already been considered (via image generation and determining information for the specimen from the images) and/or modes that have not already been considered in this manner. For example, based on some of the results of the steps described herein, such as the determining information step, some modes not yet considered may be eliminated from being considered in other steps like the predicting probabilities step. In one such example, if one of the modes that has been considered via image generation and information determination shows that it is completely unsuitable for the specimen and the process for which modes are being selected, other modes in the as yet unexplored space that are substantially similar in one or more imaging parameters may be safely eliminated from further consideration. Such modes may of course be identified by the predicting probabilities step, but they may be eliminated based on their similarity to the modes under consideration as well.

The analysis may also include ranking the modes that have been considered and/or in the unexplored space. For example, at any point during the mode analysis and selection, the computer subsystem may rank the modes for which images have already been generated based on the values of the characteristic of the information determined for the specimen with their respective images. Considering the example of SNR values, the computer subsystem may rank the already run modes from best SNR values to worst SNR values. Such ranking may be performed through the mode selection process to keep track of which is/are the best mode or modes. The ranking may also be performed for the unexplored space, for example, based on the predicted probabilities. In one such example, any time that the predicting probabilities step is performed, the computer subsystem may rank the unexplored modes from best to worst values of the predicted probability values so that the unexplored modes can be selected (in step 410) and run (in steps 402 and 404), e.g., from modes that are more likely to be good to modes that are less likely to be good.

The embodiments described herein can be used for selecting modes for single mode and multi-mode processes in a number of different ways. For example, the relationship described herein can be generated for only single modes. The top single mode may be identified as described herein and selected for use in the specimen process. The relationship can also or alternatively be generated for one or more mode combinations. For example, each state in the graph generated for the relationship may correspond to one mode combination. Such a graph may also include states for single modes. In this manner, the probabilities described herein may be predicted for both single modes and multiple mode combinations in the same step and using the same relationship, and the modes that are selected next for analysis may include single mode configurations and/or multi-mode tool configurations.

In a different manner, the embodiments described herein may be configured for analyzing and selecting only single modes, and the top single mode(s) may be identified for use in the process. Any identified top single mode(s) may be combined with one or more other modes to generate different mode combinations. The different mode combinations may then be analyzed as described herein or in any other suitable manner known in the art. Such analysis may be performed to determine if images generated with the identified top single mode(s) can be used in combination with images generated with one or more other modes to synergistically improve the results of the process. In this manner, the embodiments described herein may first select the single best mode and then determine if one or more other modes can be combined with it to further improve its performance.

Once the mode(s) have been selected for the process, the computer subsystem or another method or system may select one or more other parameters for the process. Such parameters may include any image processing parameters, any parameters of a method or system that will be used to determine information from the images generated with the selected mode(s), any parameters of a method or system that will be used to determine additional information for the specimen from the determined information, any parameters of a method or system that will be used to generate results for the process, etc. To give just one example, the computer subsystem may be configured to determine a threshold of a defect detection method that will be applied to the images generated by a selected mode to detect defects in the images. Such parameters may be selected in any suitable manner known in the art.

In one embodiment, the generating, determining, predicting, and selecting steps are performed without user input. For example, the embodiments described herein eliminate all of the user dependency in choosing the optics modes to be evaluated for a given specimen layer and reliably predict the best optics modes with the least number of mode evaluations. In particular, the embodiments described herein provide a ML-based flow that can automate mode selection completely. The embodiments described herein are therefore different than currently used methods in which steps such as analyzing unexplored mode space, picking a potential good mode subset, and determining if suitable modes have been found are performed manually by a user.

The embodiments described herein provide a number of significant improvements and advantages for mode selection compared to currently used methods and systems. One such advantage is that the embodiments make it possible to achieve recipe entitlement on every layer. Another advantage is that optics mode selection is a difficult skill to be trained on. Therefore, the embodiments can reduce applications engineering training drastically. The embodiments described herein will also advantageously save a lot of tool time for both research and development and ramp phase tool users since the number of modes evaluated will be more controlled and deterministic. Improved user satisfaction is another advantage of the embodiments described herein since the user is not dependent on expert applications engineers for recipe setup. A further advantage of the embodiments described herein is that there will be no variance in the top mode(s) selected from user to user since the flow is deterministic.

An additional advantage of the embodiments described herein is that the recommender system can neutralize some possible forms of user bias, e.g., to discovery mode of the defects, since it is designed to explore the mode space until converged. For example, prior to optics selection, defect discovery may be performed in which multiple modes are used to try to discover defect types that may be present on a specimen. Then, during optics selection as currently performed, a user may have bias towards (or against) certain modes that captured (or missed) defects during the discovery process. However, the mode(s) used for defect discovery may not be run at the optimal condition, and without the embodiments described herein, mode selection may be made without considering the entire optics mode space and may result in less than optimal modes being selected for an inspection process. The embodiments described herein can completely eliminate any such user bias on the mode selection process.

In some embodiments, the computer subsystem is configured for storing information for the selected mode(s) for the next steps of the mode selection process and/or for use in a process such as inspection of the specimen. The computer subsystem may be configured to store the information in a recipe or by generating a recipe for the process in which the selected mode(s) will be used. A "recipe" as that term is used herein can be generally defined as a set of instructions that can be used by a tool to perform a process on a specimen. In this manner, generating a recipe may include generating information for how a process is to be performed, which can then be used to generate the instructions for performing that process. The information for the selected mode(s) that is stored by the computer subsystem may include any information that can be used to identify and/or use the selected mode(s) (e.g., such as a file name and where it is stored, and the file may include information for the modes such as mode names, mode parameter values, etc.).

The computer subsystem may be configured for storing the information for the selected mode(s) in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate an inspection recipe as described above. That inspection recipe may then be stored and used by the system or method (or another system or method) to inspect the specimen or other specimens to thereby generate information (e.g., defect information) for the specimen or other specimens.

The computer subsystem and/or the inspection system may be configured to use the results of one or more steps described herein to perform the inspection process on the specimen and/or other specimens of the same type. Such an inspection process may produce results for any defects detected on the specimen(s) such as information, e.g., location, etc., of the bounding boxes of the detected defects, detection scores, information about defect classifications such as class labels or IDs, etc., or any such suitable information known in the art. The results for the defects may be generated by the computer subsystem and/or inspection system in any suitable manner. The results for the defects may have any suitable form or format such as a standard file type. The computer subsystem and/or inspection system may generate the results and store the results such that the results can be used by the computer subsystem and/or another system or method to perform one or more functions for the specimen(s) or another specimen of the same type. For example, that information may be used by the computer subsystem or another system or method for sampling the defects for defect review or other analysis, determining a root cause of the defects, etc.

In the same manner, the computer subsystem and/or other imaging subsystems described herein (e.g., a metrology or defect review subsystem) may be configured to use results of one or more steps described herein to perform other processes on the specimen and/or other specimens of the same type. Such metrology or defect review processes may produce any suitable results known in the art, and the results of such processes may be generated and/or stored by the computer subsystem and/or imaging subsystem as described herein. Those results can then be used in the same manner described herein.

Functions that can be performed using such information also include, but are not limited to, altering a process such as a fabrication process or step that was or will be performed on the inspected specimen or another specimen in a feedback or feedforward manner. For example, the computer subsystem may be configured to determine one or more changes to a process that was performed on a specimen inspected as described herein and/or a process that will be performed on the specimen based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art. Such changes may also be determined using results of other processes described herein.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or inspection system described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

As described herein, therefore, the embodiments can be used to setup a new process or recipe. The embodiments may also be used to modify an existing process or recipe, whether that is a process or recipe that was used for the specimen or was created for one specimen and is being adapted for another specimen.

Each of the embodiments described above may be combined together into one single embodiment. In other words, unless otherwise noted herein, none of the embodiments are mutually exclusive of any other embodiments.

Another embodiment relates to a computer-implemented method for selecting modes for a mode selection process. The method includes generating images for a specimen with different modes of an imaging subsystem, e.g., as shown in step 402. The method also includes determining information for the specimen and at least one value of a characteristic of the information from the images generated with an initial subset of the different modes, e.g., as shown in step 404. In addition, the method includes predicting probabilities that better values of the characteristic are determined from the images generated with the different modes other than the initial subset based on the determined at least one value of the characteristic and a relationship between the different modes and associated values of the characteristic of the information, e.g., as shown in step 408. The method further includes selecting an additional subset of the different modes for which the generating and determining steps are performed next by the imaging subsystem and a computer subsystem, respectively, based on the predicted probabilities, e.g., as shown in step 410. The determining, predicting, and selecting steps are performed by the computer subsystem.

Each of the steps of the method may be performed as described further herein. The method may also include any other step(s) that can be performed by the imaging subsystem and/or computer subsystem described herein. In addition, the method described above may be performed by any of the system embodiments described herein.

Figure 5:
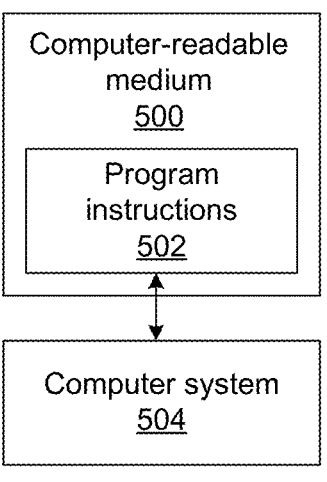
FIG. 5 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for selecting modes for a mode selection process. One such embodiment is shown in FIG. 5. In particular, as shown in FIG. 5, non-transitory computer-readable medium 500 includes program instructions 502 executable on computer system 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), Python, Tensorflow, or other technologies or methodologies, as desired.

Computer system 504 may be configured according to any of the embodiments described herein.

Further modifications and alternative embodiments of various aspects of the invention will be apparent to those skilled in the art in view of this description. For example, methods and systems for selecting modes for a mode selection process are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for selecting modes for a mode selection process, comprising:
   an imaging subsystem configured for generating images for a specimen with different modes of the imaging subsystem; and
   a computer subsystem configured for:
      determining information for the specimen and at least one value of a characteristic of the information from the images generated with an initial subset of the different modes;
      predicting probabilities that better values of the characteristic are determined from the images generated with the different modes other than the initial subset based on the determined at least one value of the characteristic and a relationship between the different modes and associated values of the characteristic of the information;
      predicting additional probabilities that additional better values of the characteristic are determined from the images generated with additional different modes of the imaging subsystem other than the initial subset based on the determined at least one value of the characteristic and an additional relationship between the additional different modes and additional associated values of the characteristic of the information; and
      selecting an additional subset of the different modes for which the generating and determining steps are performed next by the imaging and computer subsystems, respectively, based on the predicted probabilities.

2. The system of claim 1, wherein the relationship is determined by reinforcement learning.

3. The system of claim 1, wherein the computer subsystem is further configured for determining the relationship by reinforcement learning.

4. The system of claim 1, wherein the relationship is determined by reinforcement learning in which the different modes are states and the associated values are values of the states.

5. The system of claim 1, wherein the at least one value of the characteristic and the associated values of the characteristic are signal-to-noise ratio values of defects detected in the images.

6. The system of claim 1, wherein the relationship is based on physics of the imaging subsystem, and wherein the system is further configured for selecting modes for a mode selection process performed for a different specimen for which the imaging subsystem generates images in a process performed on the different specimen.

7. The system of claim 1, wherein the computer subsystem is further configured for generating a graph that visualizes the relationship.

8. The system of claim 1, wherein the different modes comprise an entire optics mode space for the imaging subsystem.

9. The system of claim 1, wherein the different modes and the additional different modes are defined by at least one mutually exclusive parameter of the imaging subsystem.

10. The system of claim 1, wherein the different modes and the additional different modes are defined by at least one orthogonal and non-overlapping parameter of the imaging subsystem.

11. The system of claim 1, wherein the imaging and computer subsystems are further configured for performing the generating and determining steps, respectively, for the additional subset of the different modes, and wherein the computer subsystem is further configured for comparing the information for the specimen determined from the images generated with the additional and initial subsets of the different modes and, based on results of the comparing, determining if selecting the additional subset of the different modes is converging to a top subset of the different modes for a process performed on the specimen.

12. The system of claim 11, wherein the computer subsystem is further configured for determining that the selecting has converged to the top subset of the different modes when the results of the comparing indicate no improvement in the information for the specimen determined from the images generated with the additional and initial subsets of the different modes.

13. The system of claim 1, wherein the imaging and computer subsystems are further configured for performing the generating and determining steps, respectively, for the additional subset of the different modes, and wherein the computer subsystem is further configured for updating the predicted probabilities based on the at least one value of the characteristic determined with the additional subset of the different modes.

14. The system of claim 1, wherein the initial subset of the different modes comprises one or more best known modes for a process performed on the specimen with the images generated by the imaging subsystem.

15. The system of claim 1, wherein selecting the additional subset of the different modes comprises selecting one or more of the different modes other than the initial subset for which highest values of the probabilities are predicted.

16. The system of claim 1, wherein the generating, determining, predicting, and selecting steps are performed without user input.

17. The system of claim 1, wherein predicting the probabilities is not trained with pre-existing data.

18. A system configured for selecting modes for a mode selection process, comprising:
   an imaging subsystem configured for generating images for a specimen with different modes of the imaging subsystem; and
   a computer subsystem configured for:
      determining information for the specimen and at least one value of a characteristic of the information from the images generated with an initial subset of the different modes;
      predicting probabilities that better values of the characteristic are determined from the images generated with the different modes other than the initial subset based on the determined at least one value of the characteristic and a relationship between the different modes and associated values of the characteristic of the information;

selecting an additional subset of the different modes for which the generating and determining steps are performed next by the imaging and computer subsystems, respectively, based on the predicted probabilities, wherein the imaging and computer subsystems are further configured for performing the generating and determining steps, respectively, for the additional subset of the different modes;

comparing the information for the specimen determined from the images generated with the additional and initial subsets of the different modes; and based on results of the comparing, determining if selecting the additional subset of the different modes is converging to a top subset of the different modes for a process performed on the specimen.

19. A system configured for selecting modes for a mode selection process, comprising:

an imaging subsystem configured for generating images for a specimen with different modes of the imaging subsystem; and a computer subsystem configured for:

determining information for the specimen and at least one value of a characteristic of the information from the images generated with an initial subset of the different modes;

predicting probabilities that better values of the characteristic are determined from the images generated with the different modes other than the initial subset based on the determined at least one value of the characteristic and a relationship between the different modes and associated values of the characteristic of the information;

selecting an additional subset of the different modes for which the generating and determining steps are performed next by the imaging and computer subsystems, respectively, based on the predicted probabilities, wherein the imaging and computer subsystems are further configured for performing the generating and determining steps, respectively, for the additional subset of the different modes; and updating the predicted probabilities based on the at least one value of the characteristic determined with the additional subset of the different modes.

* * * * *